(12) United States Patent
Frick et al.

(10) Patent No.: US 8,764,068 B2
(45) Date of Patent: Jul. 1, 2014

(54) QUICK CONNECT COUPLING WITH RETENTION FEATURE

(75) Inventors: Timothy A. Frick, Brunswick, OH (US); W. Randall Tucker, Oberlin, OH (US)

(73) Assignee: Moen Incorporated, North Olmsted, OH (US)

( * ) Notice: Subject to any disclaimer, the term of this patent is extended or adjusted under 35 U.S.C. 154(b) by 41 days.

(21) Appl. No.: 13/468,515

(22) Filed: May 10, 2012

(65) Prior Publication Data

US 2013/0300108 A1 Nov. 14, 2013

(51) Int. Cl.
*F16L 39/00* (2006.01)

(52) U.S. Cl.
USPC .......................................... 285/317; 285/308

(58) Field of Classification Search
USPC .................................. 285/317, 308; 251/149.1
See application file for complete search history.

(56) References Cited

U.S. PATENT DOCUMENTS

| | | |
|---|---|---|
| 3,383,124 A | 5/1968 | Wickens |
| 3,948,548 A | 4/1976 | Voss |
| 4,244,608 A | 1/1981 | Stuemky |
| 4,423,892 A | 1/1984 | Bartholomew |
| 4,436,125 A | 3/1984 | Blenkush |
| 4,500,118 A | 2/1985 | Blenkush |
| 4,541,457 A | 9/1985 | Blenkush |
| 4,591,192 A | 5/1986 | Van Exel et al. |
| 4,630,847 A | 12/1986 | Blenkush |
| 4,664,427 A | 5/1987 | Johnston |
| 4,703,957 A | 11/1987 | Blenkush |
| 4,903,995 A | 2/1990 | Blenkush et al. |
| 4,934,655 A | 6/1990 | Blenkush et al. |
| 4,946,200 A | 8/1990 | Blenkush et al. |
| 4,969,879 A | 11/1990 | Lichte |
| 5,033,777 A | 7/1991 | Blenkush |
| 5,052,725 A | 10/1991 | Meyer et al. |
| 5,064,227 A | 11/1991 | Spors et al. |
| 5,102,313 A | 4/1992 | Szabo |
| 5,104,158 A | 4/1992 | Meyer et al. |
| 5,178,303 A | 1/1993 | Blenkush et al. |
| 5,316,041 A | 5/1994 | Ramacier, Jr. et al. |
| 5,353,836 A | 10/1994 | deCler et al. |
| D357,307 S | 4/1995 | Ramacier, Jr. et al. |
| 5,452,924 A | 9/1995 | Kujawski |
| 5,494,074 A | 2/1996 | Ramacier, Jr. et al. |
| 5,542,716 A | 8/1996 | Szabo et al. |
| 5,586,792 A | 12/1996 | Kalahasthy et al. |
| 5,639,064 A | 6/1997 | deCler et al. |
| D384,731 S | 10/1997 | Ramacier, Jr. et al. |
| 5,683,117 A | 11/1997 | Corbett et al. |
| 5,730,481 A | 3/1998 | Szabo et al. |
| 5,758,909 A | 6/1998 | Dole et al. |
| 5,782,502 A | 7/1998 | Lewis |
| 5,845,943 A | 12/1998 | Ramacier, Jr. et al. |

(Continued)

OTHER PUBLICATIONS

International Search Report for International App. No. PCT/US2013/040079 dated Sep. 6, 2013 (3 pages).

(Continued)

*Primary Examiner* — Aaron Dunwoody
(74) *Attorney, Agent, or Firm* — Calfee, Halter & Griswold LLP

(57) ABSTRACT

The present invention provides a quick connect coupling with a retention feature that resists inadvertent disconnection of the coupling in a pressurized state.

6 Claims, 21 Drawing Sheets

(56) References Cited

U.S. PATENT DOCUMENTS

| | | | |
|---|---|---|---|
| 5,863,077 A | 1/1999 | Szabo et al. |
| 5,897,142 A | 4/1999 | Kulevsky |
| 5,911,403 A | 6/1999 | deCler et al. |
| 5,931,510 A | 8/1999 | Mathew et al. |
| 5,938,244 A | 8/1999 | Meyer |
| 5,951,063 A | 9/1999 | Szabo |
| 5,975,489 A | 11/1999 | deCler et al. |
| 6,024,124 A | 2/2000 | Braun et al. |
| 6,082,401 A | 7/2000 | Braun et al. |
| 6,129,393 A | 10/2000 | Kodama et al. |
| 6,161,578 A | 12/2000 | Braun et al. |
| 6,231,089 B1 * | 5/2001 | DeCler et al. ................. 285/317 |
| 6,293,596 B1 | 9/2001 | Kinder |
| 6,382,593 B1 | 5/2002 | deCler et al. |
| 6,431,612 B1 | 8/2002 | Walker et al. |
| 6,550,815 B2 | 4/2003 | Zitkowic, Jr. et al. |
| 6,557,903 B2 | 5/2003 | Walker |
| 6,626,419 B2 | 9/2003 | deCler et al. |
| 6,634,679 B1 | 10/2003 | Stieler |
| 6,637,779 B2 | 10/2003 | Andre |
| 6,649,829 B2 | 11/2003 | Garber et al. |
| 6,705,591 B2 | 3/2004 | deCler |
| 6,802,491 B1 | 10/2004 | Kelly et al. |
| 6,805,383 B2 | 10/2004 | Ostrander et al. |
| 6,848,602 B2 | 2/2005 | deCler et al. |
| 6,869,110 B2 | 3/2005 | Okada et al. |
| 6,871,669 B2 | 3/2005 | Meyer et al. |
| 6,897,374 B2 | 5/2005 | Garber et al. |
| 6,902,144 B2 | 6/2005 | deCler |
| 6,905,143 B2 | 6/2005 | Klinger et al. |
| 6,916,007 B2 | 7/2005 | deCler et al. |
| 6,962,275 B2 | 11/2005 | deCler et al. |
| 6,978,800 B2 | 12/2005 | deCler et al. |
| 7,080,665 B2 | 7/2006 | Whall |
| 7,163,022 B2 | 1/2007 | Whall |
| 7,314,209 B2 | 1/2008 | Pierson |
| 7,316,425 B2 | 1/2008 | Poder |
| 7,316,428 B2 | 1/2008 | Takayanagi et al. |
| 7,328,922 B2 | 2/2008 | Takayanagi et al. |
| 7,390,025 B2 | 6/2008 | Pepe et al. |
| 7,394,375 B2 | 7/2008 | Johnson |
| 7,402,063 B2 | 7/2008 | Montena |
| 7,434,842 B2 | 10/2008 | Schmidt |
| 7,434,847 B2 | 10/2008 | Densel et al. |
| 7,469,472 B2 | 12/2008 | deCler et al. |
| 7,484,774 B2 | 2/2009 | Kerin et al. |
| 7,488,446 B2 | 2/2009 | Meyer et al. |
| 7,537,247 B2 | 5/2009 | Trede et al. |
| 7,546,857 B2 | 6/2009 | Chadbourne et al. |
| 7,547,047 B2 | 6/2009 | deCler et al. |
| 7,562,906 B2 | 7/2009 | Schmidt |
| D602,128 S | 10/2009 | Williams et al. |
| 7,631,660 B2 | 12/2009 | deCler et al. |
| 7,647,954 B2 | 1/2010 | Garber et al. |
| D612,019 S | 3/2010 | Williams et al. |
| D612,021 S | 3/2010 | Schmidt |
| 7,695,020 B2 | 4/2010 | Schmidt |
| 7,695,024 B2 | 4/2010 | Ostergren et al. |
| 7,708,025 B2 | 5/2010 | Johnson |
| 7,802,822 B2 * | 9/2010 | Poder et al. ................... 285/317 |
| 7,841,357 B2 | 11/2010 | Rankin |
| 7,954,374 B2 | 6/2011 | Rankin |
| 7,954,515 B2 | 6/2011 | Gerst |
| 2005/0057042 A1 | 3/2005 | Wicks |
| 2005/0189764 A1 | 9/2005 | Ono |
| 2005/0236833 A1 | 10/2005 | Poirier et al. |
| 2006/0082145 A1 | 4/2006 | Steveley |
| 2006/0207345 A1 | 9/2006 | Rankin |
| 2007/0025811 A1 | 2/2007 | Wilhelm |
| 2007/0126232 A1 | 6/2007 | Campagna et al. |
| 2007/0232155 A1 | 10/2007 | Frey |
| 2009/0177186 A1 | 7/2009 | Delano |
| 2009/0188575 A1 | 7/2009 | Williams et al. |
| 2010/0089475 A1 | 4/2010 | Tracey |

OTHER PUBLICATIONS

Written Opinion of the International Searching Authority for International App. No. PCT/US2013/040079 dated Sep. 6, 2013 (6 pages).

\* cited by examiner

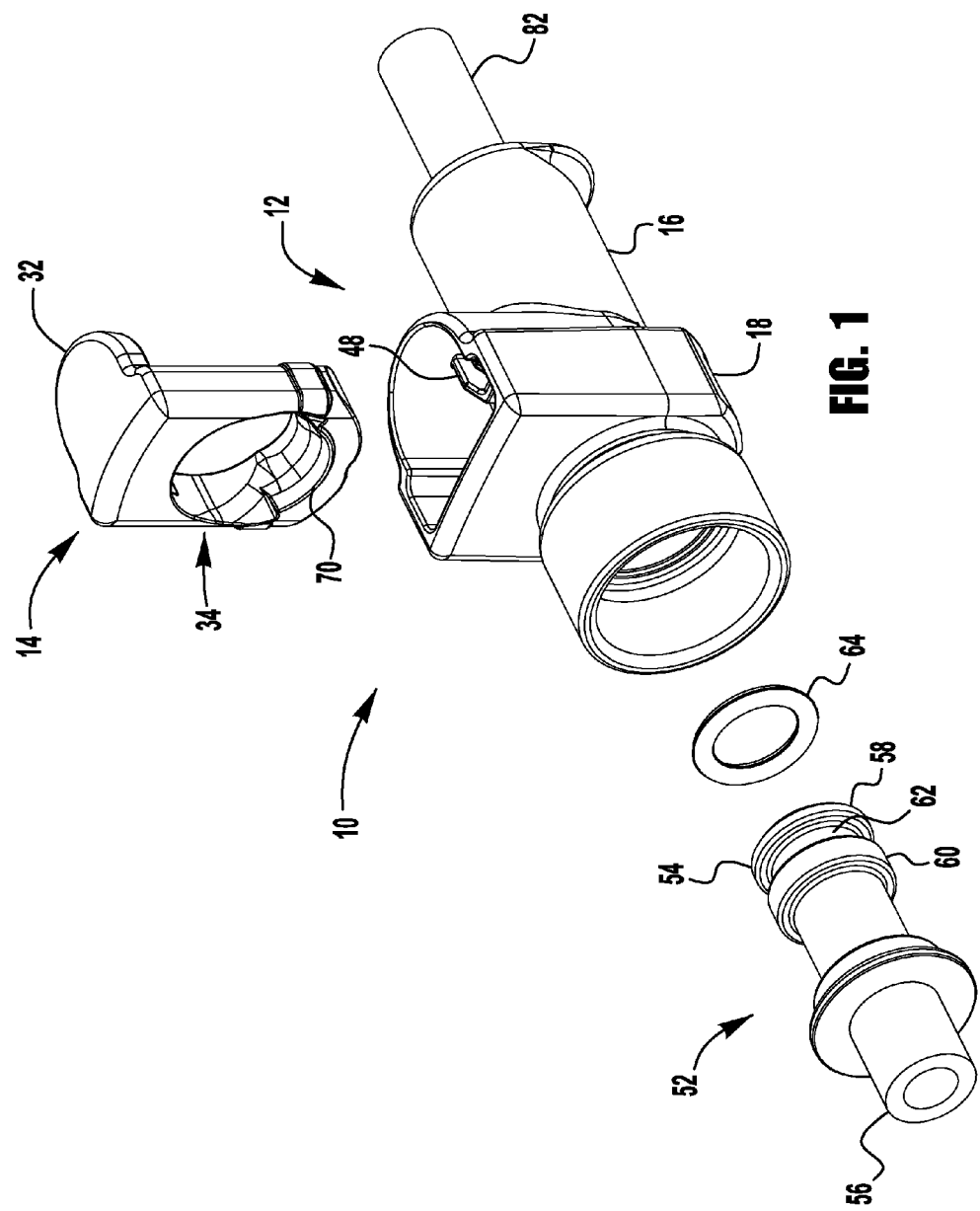

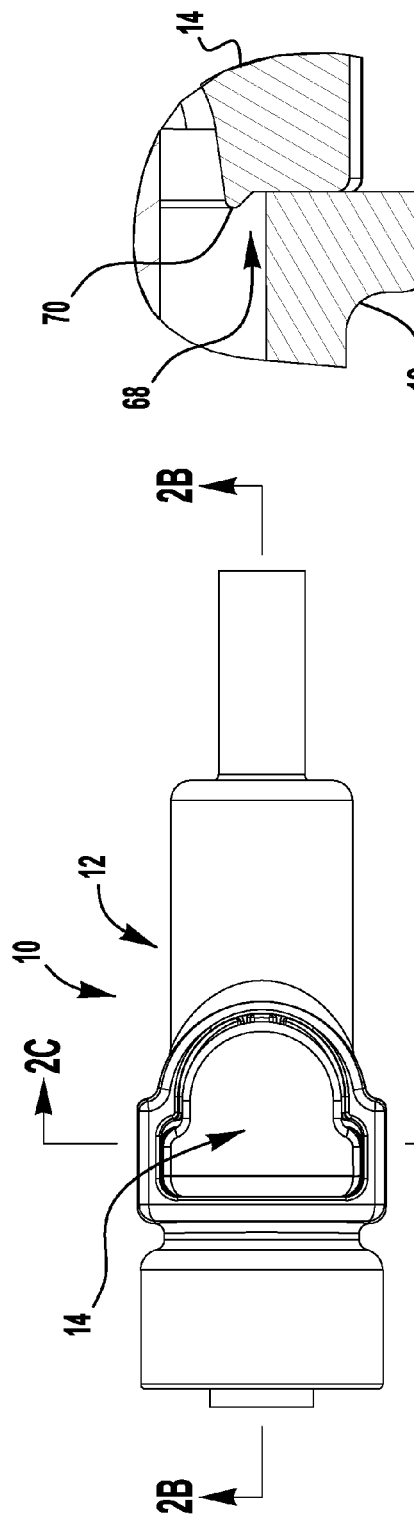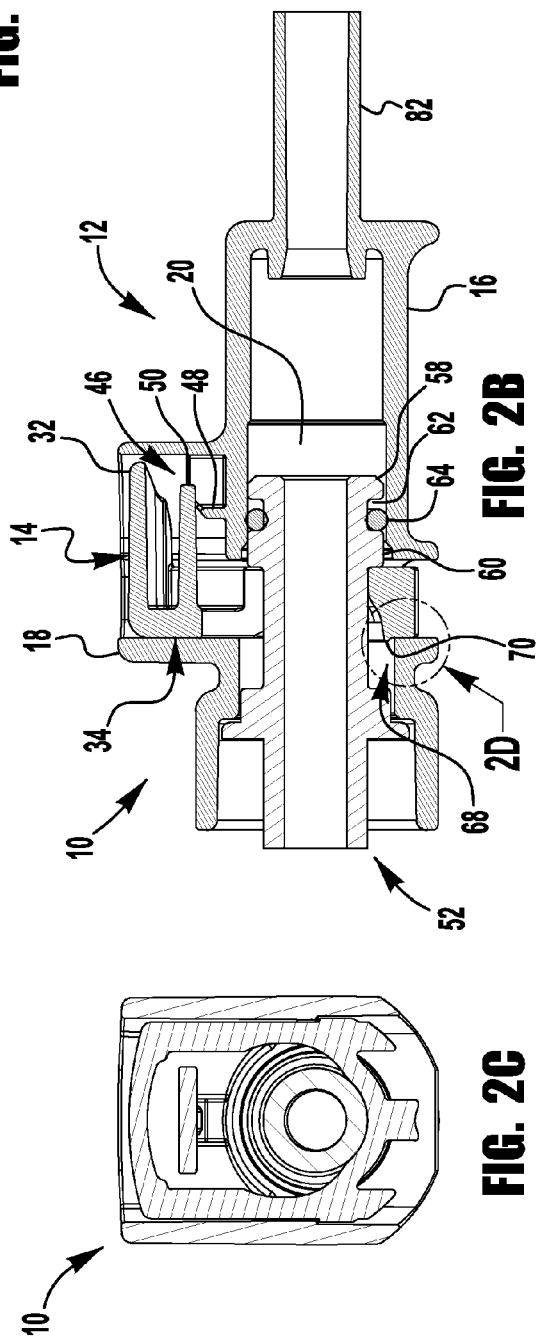

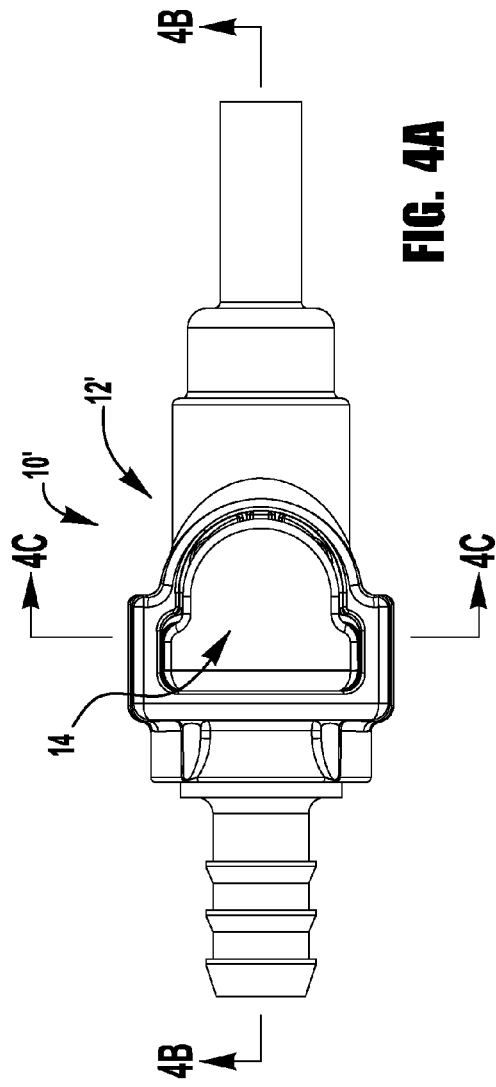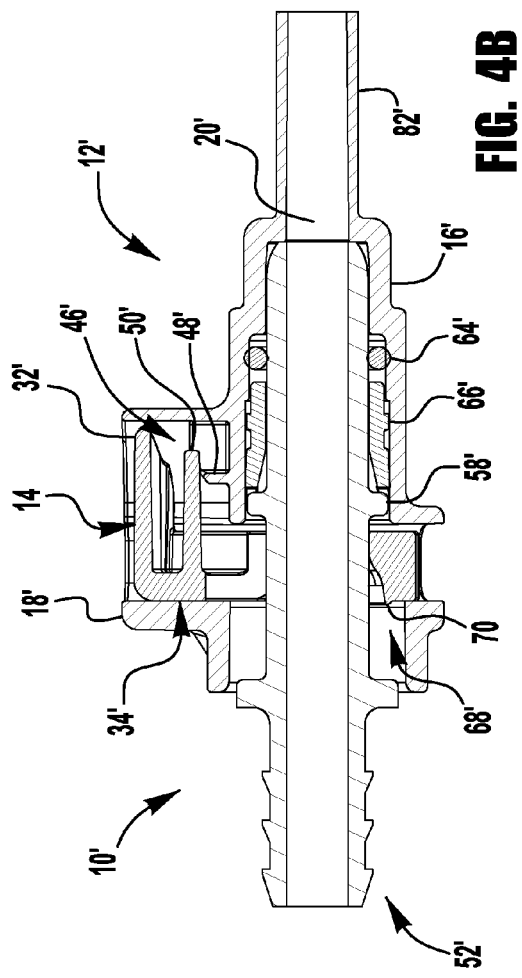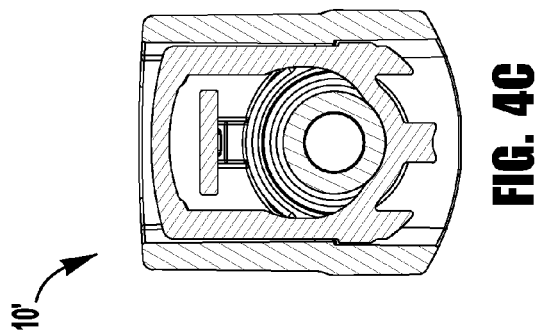

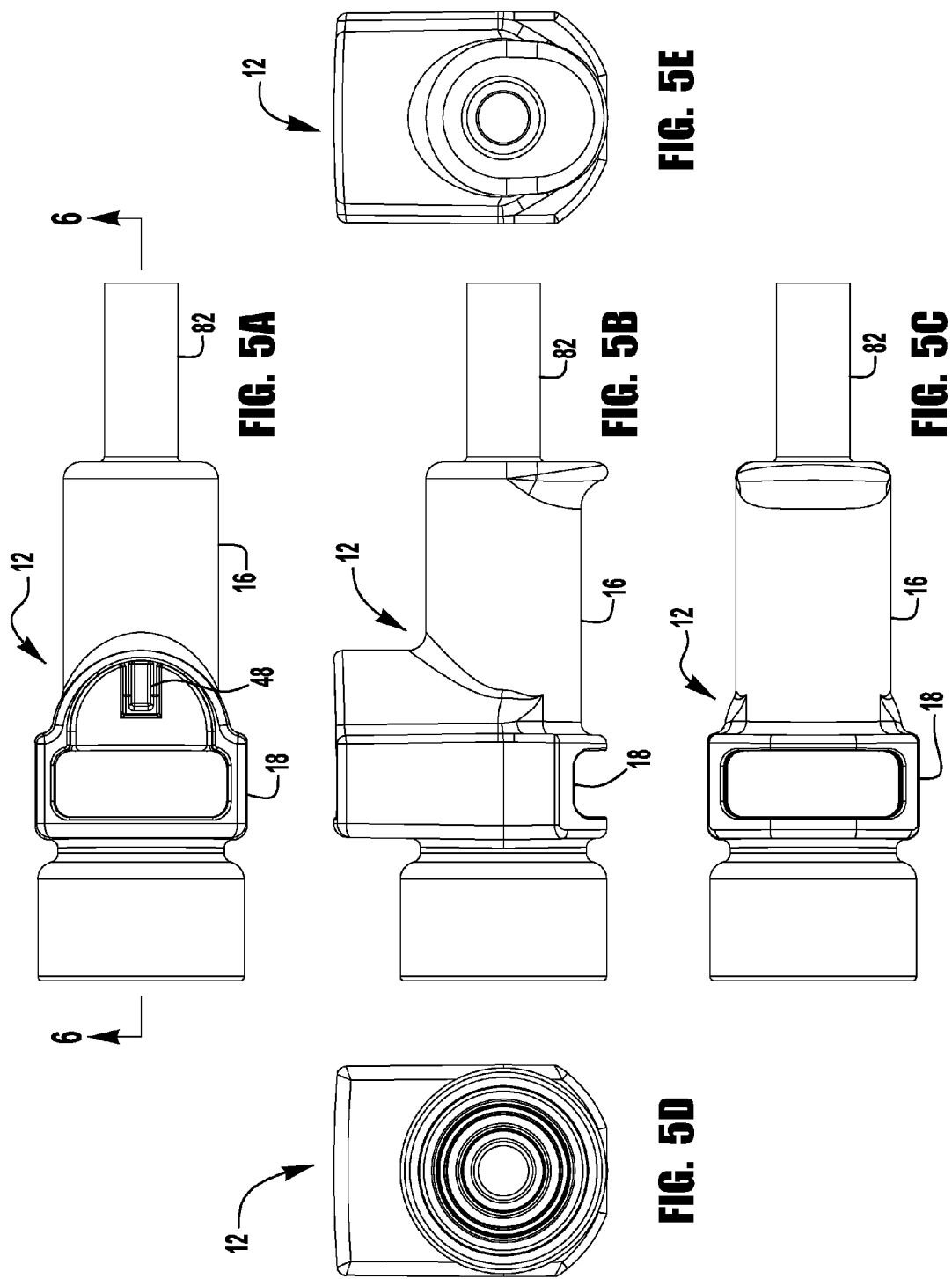

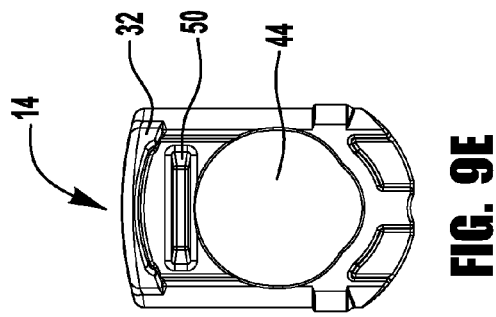
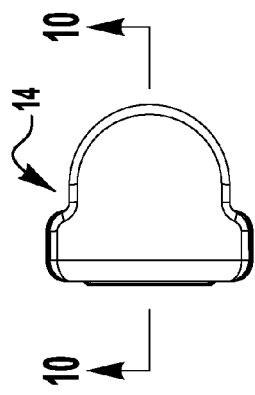
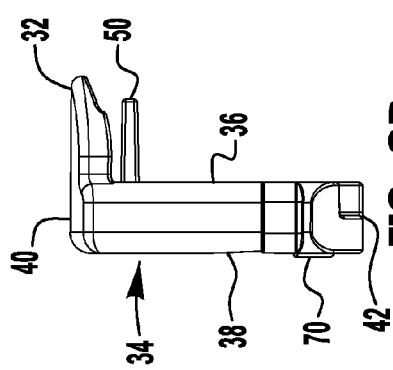
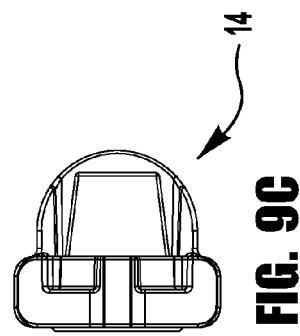
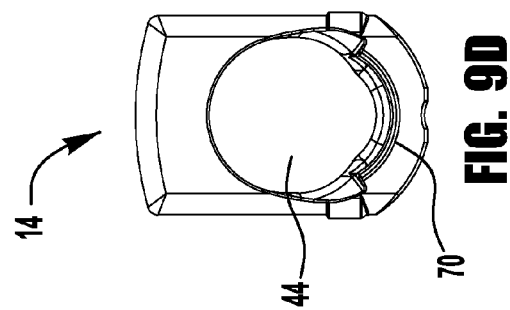

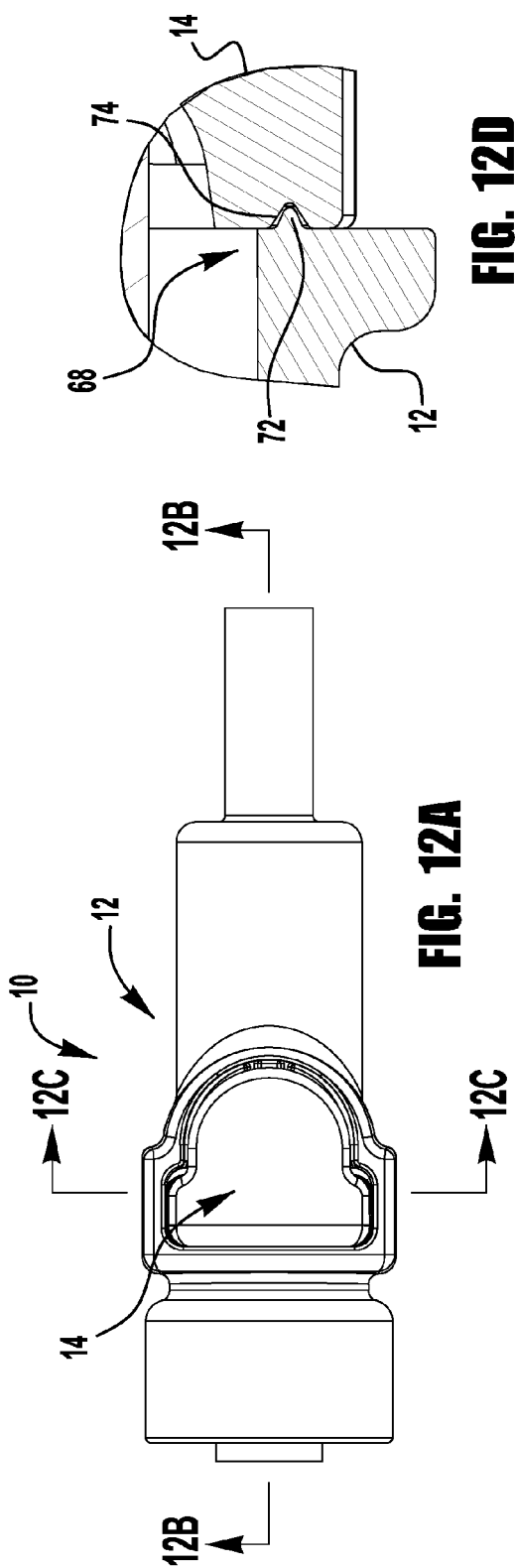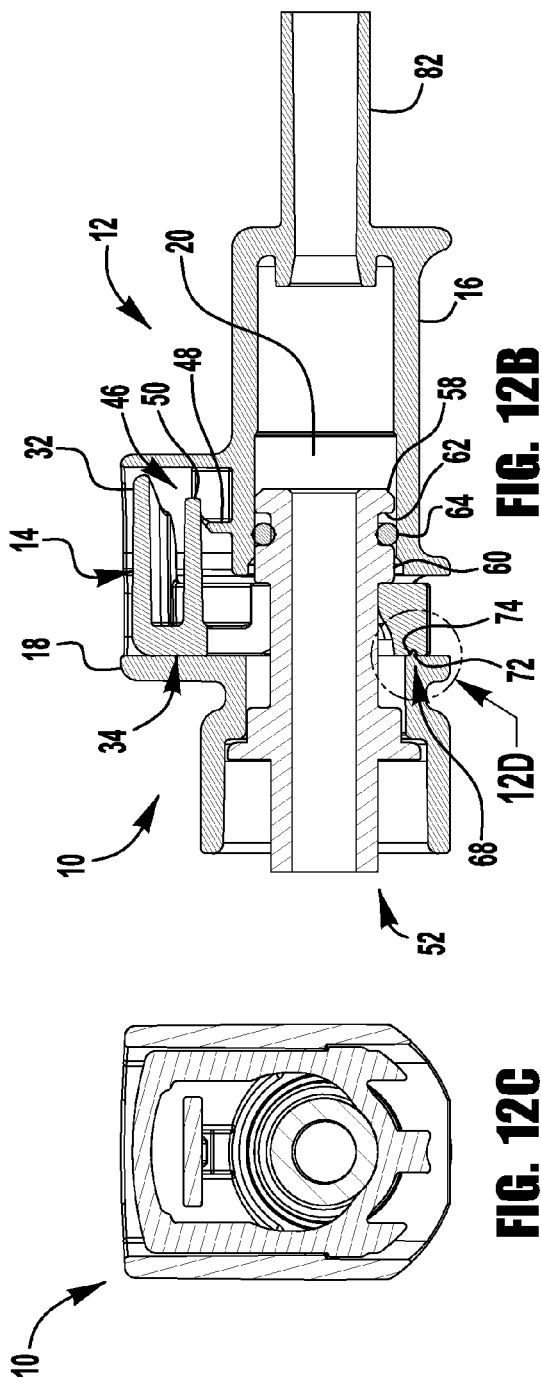

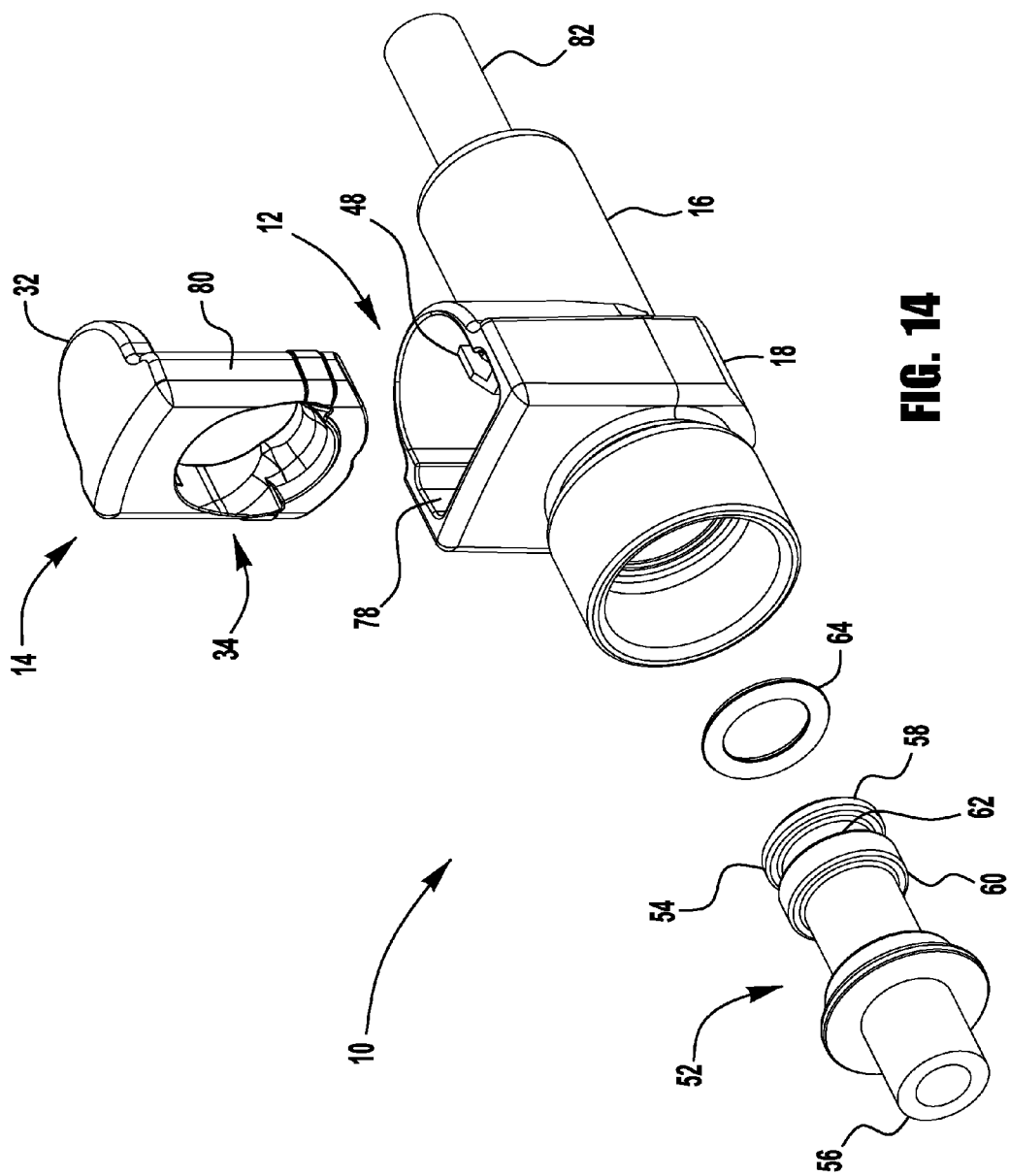

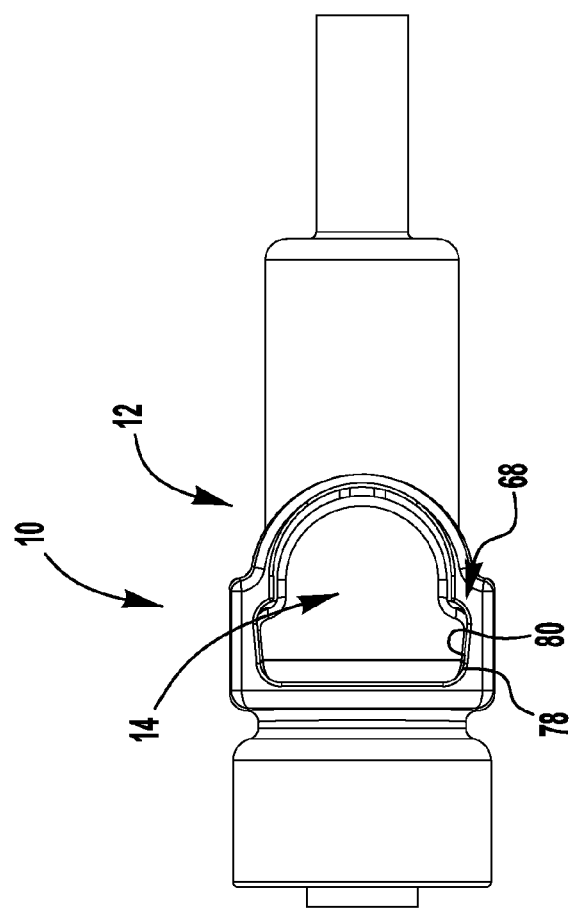

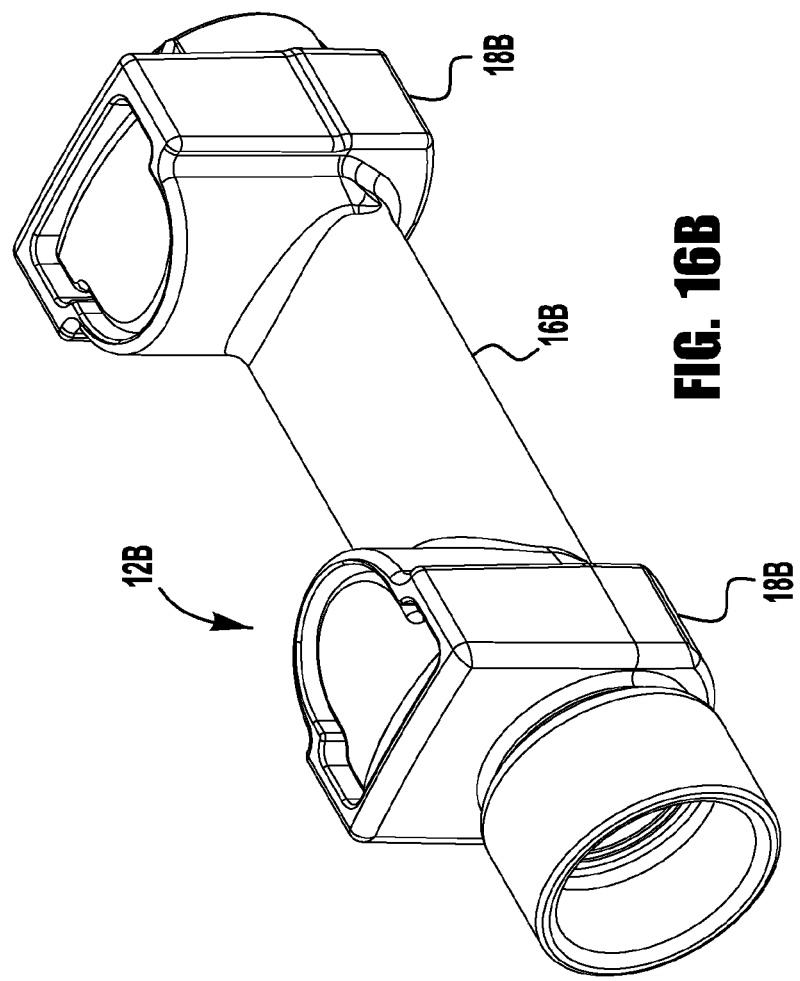

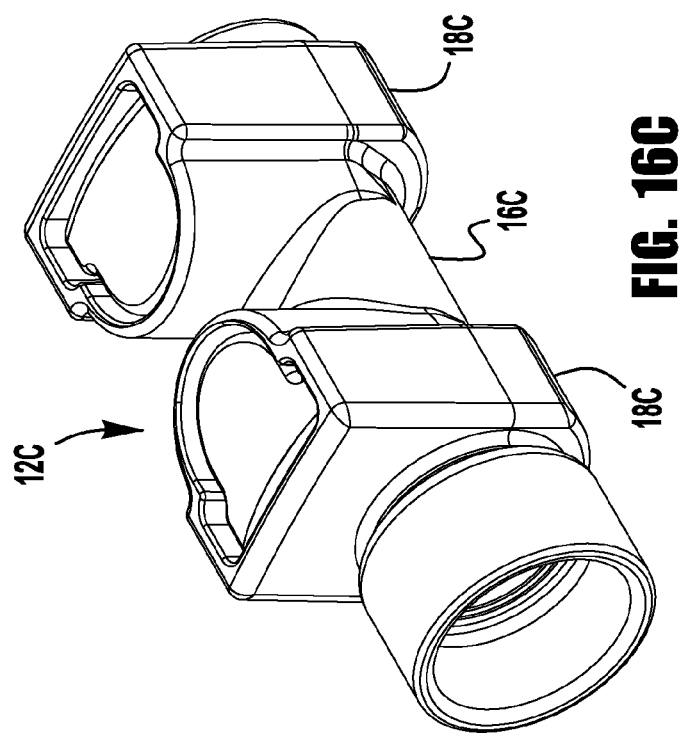

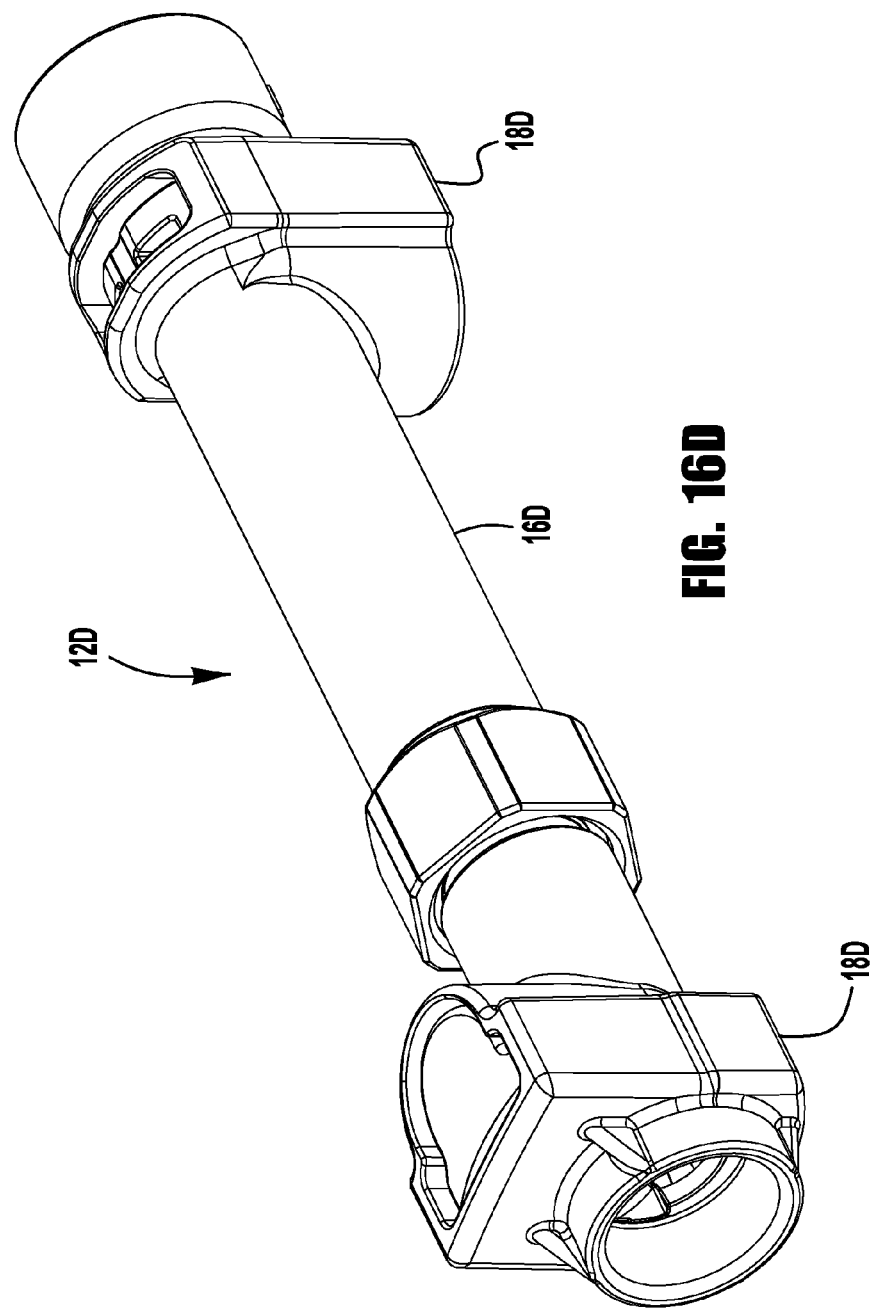

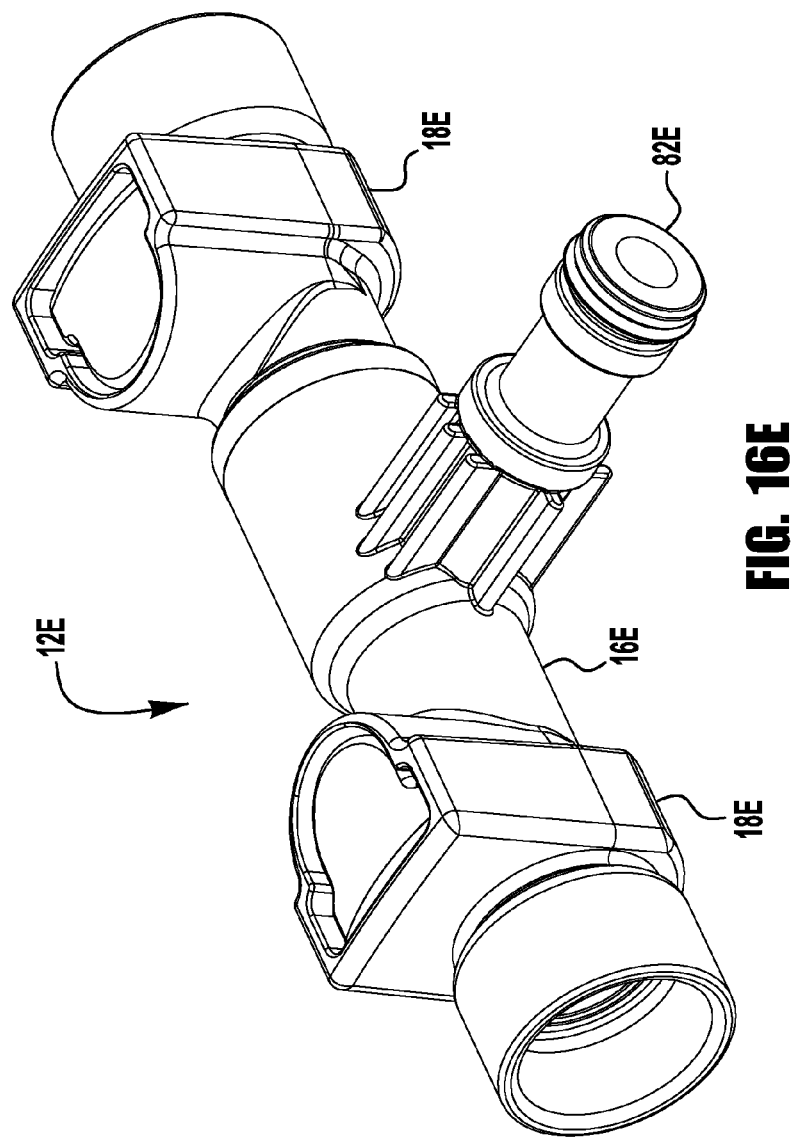

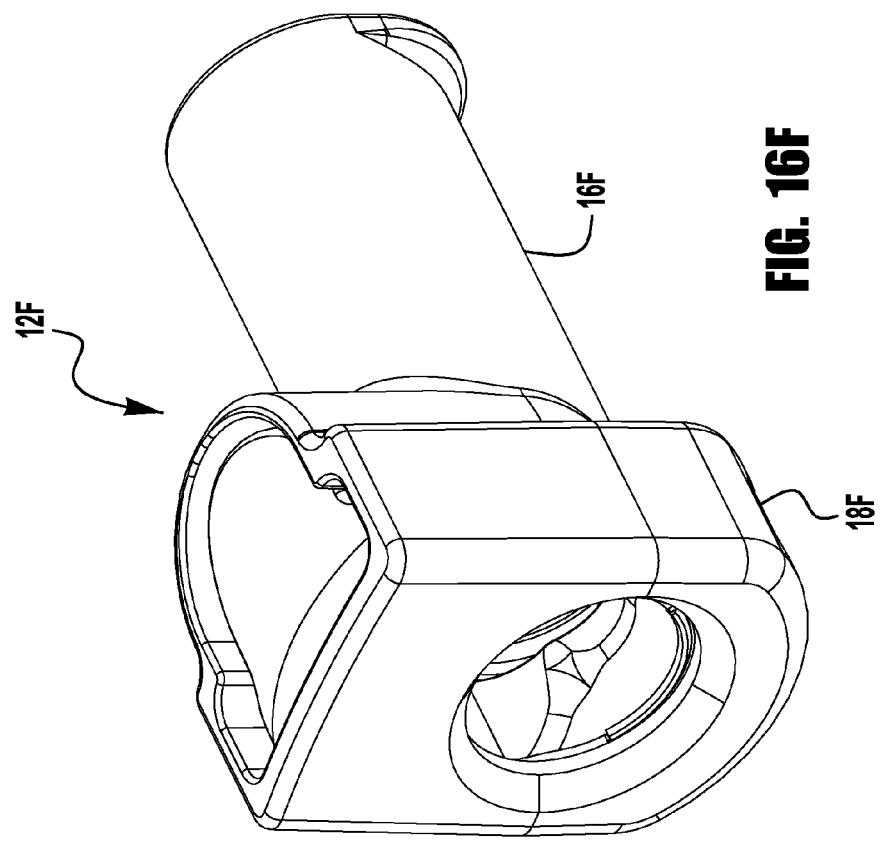

QUICK CONNECT COUPLING WITH RETENTION FEATURE

FIELD

The present invention relates generally to a quick connect coupling, and, more particularly, to a quick connect coupling with a retention feature that resists inadvertent disconnection of the coupling in a pressurized state.

BACKGROUND

Quick connect couplings enable the quick and easy connection of the coupling. The same design that results in the quick and easy connection of the coupling also results in the quick and easy disconnection of the coupling. When the coupling is unpressurized, the quick and easy disconnection of the coupling is desirable. However, when the coupling is pressurized, the quick and easy disconnection of the coupling is undesirable.

SUMMARY

The present invention provides a quick connect coupling with a retention feature that resists inadvertent disconnection of the coupling in a pressurized state.

In an exemplary embodiment, the quick connect coupling includes a housing, a clip, bias structure on at least one of the housing and the clip, and retention structure on at least one of the housing and the clip. The housing includes a longitudinal portion and a transverse portion. The housing has a longitudinal bore extending therethrough. The transverse portion has a top side and a bottom side. The transverse portion has an opening extending from the top side through the bottom side transversely to the bore. The clip includes a top portion and a base portion. The base portion has a first side and a second side. The base portion has a top side and a bottom side. The base portion has an opening extending from the first side through the second side between the top side and the bottom side. The top portion extends outwardly from the first side of the base portion near the top side of the base portion. The bias structure is operable to bias the clip toward a position in which the bore in the housing and the opening in the clip are not aligned. The retention structure is operable to significantly increase the resistance to disconnect the coupling in a pressurized state, but not significantly increase the resistance to disconnect the coupling in an unpressurized state.

In an exemplary embodiment, the quick connect coupling includes a housing, a clip, bias structure on at least one of the housing and the clip, and retention structure on at least one of the housing and the clip. The housing includes a longitudinal portion and a transverse portion. The housing has a longitudinal bore extending therethrough. The transverse portion has a top side and a bottom side. The transverse portion has an opening extending from the top side through the bottom side transversely to the bore. The housing includes a projection extending upwardly inside the transverse portion of the housing. The clip includes a top portion and a base portion. The base portion has a first side and a second side. The base portion has a top side and a bottom side. The base portion has an opening extending from the first side through the second side between the top side and the bottom side. The top portion extends outwardly from the first side of the base portion near the top side of the base portion. The clip includes a finger extending outwardly from the first side of the base portion of the clip below the top portion. The clip includes a ridge extending outwardly from the second side of the base portion of the clip near a bottom of the opening in the base portion. The finger on the clip interacts with the projection on the housing to bias the clip toward a position in which the bore in the housing and the opening in the clip are not aligned. The ridge on the clip interacts with the bore in the housing to significantly increase the resistance to disconnect the coupling in a pressurized state, but not significantly increase the resistance to disconnect the coupling in an unpressurized state.

BRIEF DESCRIPTION OF THE DRAWINGS

FIG. 1 is an exploded perspective view of a quick connect coupling according to an exemplary embodiment of the present invention;

FIGS. 2A-2D are views of the assembled quick connect coupling of FIG. 1—FIG. 2A is a top plan view, FIGS. 2B and 2C are cross-sectional views taken along the lines 2B-2B and 2C-2C in FIG. 2A, respectively, and FIG. 2D is a detailed view of the area 2D in FIG. 2B showing an exemplary embodiment of a retention feature of the quick connect coupling;

FIGS. 4A-4C are views of the assembled quick connect coupling of FIG. 3—FIG. 4A is a top plan view and FIGS. 4B and 4C are cross-sectional views taken along the lines 4B-4B and 4C-4C in FIG. 4A, respectively;

FIGS. 5A-5E are views of a housing for use in the quick connect coupling of FIG. 1—FIG. 5A is a top plan view, FIG. 5B is a front elevational view, FIG. 5C is a bottom plan view, FIG. 5D is a left side elevational view, and FIG. 5E is a right side elevational view;

—FIG. 7A is a top plan view, FIG. 7B is a front elevational view, FIG. 7C is a bottom plan view, FIG. 7D is a left side elevational view, and FIG. 7E is a right side elevational view;

FIGS. 9A-9E are views of a clip for use in the quick connect couplings of FIGS. 1 and 3—FIG. 9A is a top plan view, FIG. 9B is a front elevational view, FIG. 9C is a bottom plan view, FIG. 9D is a left side elevational view, and FIG. 9E is a right side elevational view;

FIGS. 12A-12D are views of the assembled quick connect coupling of FIG. 11—FIG. 12A is a top plan view, FIGS. 12B and 12C are cross-sectional views taken along the lines 12B-12B and 12C-12C in FIG. 12A, respectively, and FIG. 12D is a detailed view of the area 12D in FIG. 12B showing another exemplary embodiment of a retention feature of the quick connect coupling;

FIG. 14 is an exploded perspective view of a quick connect coupling according to another exemplary embodiment of the present invention;

FIG. 15 is a top plan view of the assembled quick connect coupling of FIG. 14 showing another exemplary embodiment of a retention feature of the quick connect coupling; and FIGS. 16A-16F are views of housings for use in quick connect couplings according to additional exemplary embodiments of the present invention.

DETAILED DESCRIPTION

Figure 3:
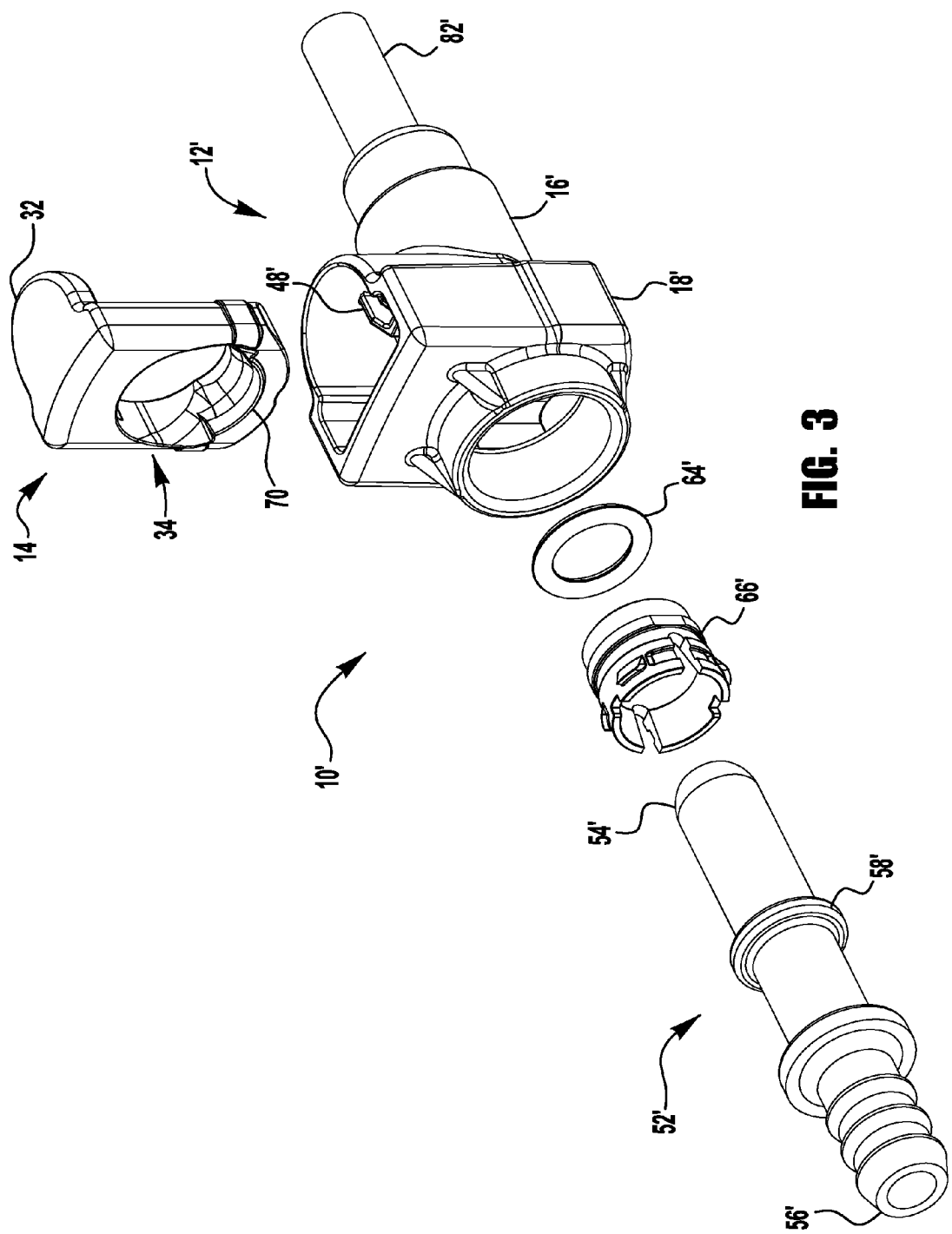
FIG. 3 is an exploded perspective view of a quick connect coupling according to another exemplary embodiment of the present invention.

The present invention provides a quick connect coupling with a retention feature that resists inadvertent disconnection of the coupling in a pressurized state. An exemplary embodiment of a quick connect coupling 10 of the present invention is shown in FIGS. 1-2D. Another exemplary embodiment of a quick connect coupling 10' of the present invention is shown in FIGS. 3-4C. In the illustrated embodiments, the quick connect coupling 10, 10' includes a housing 12, 12' and a clip 14.

Figure 6:
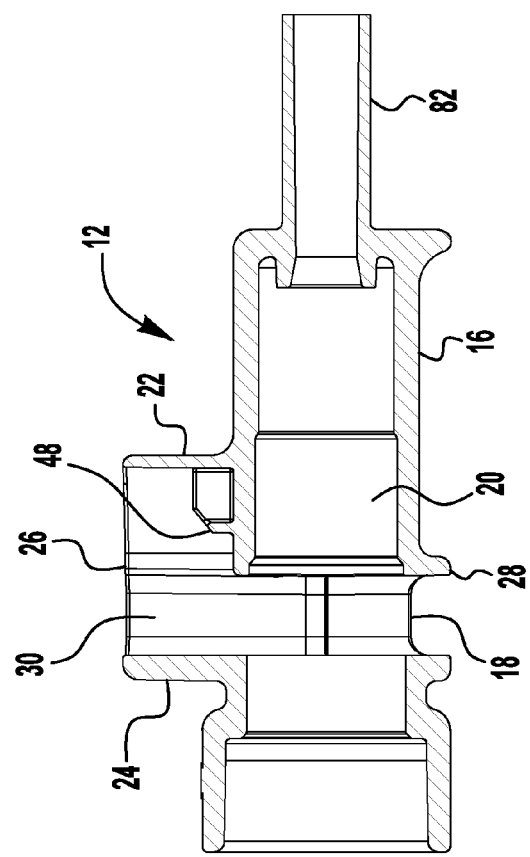
FIG. 6 is a cross-sectional view of the housing of FIGS. 5A-5E taken along the line 6-6 in FIG. 5A.
Figure 7:
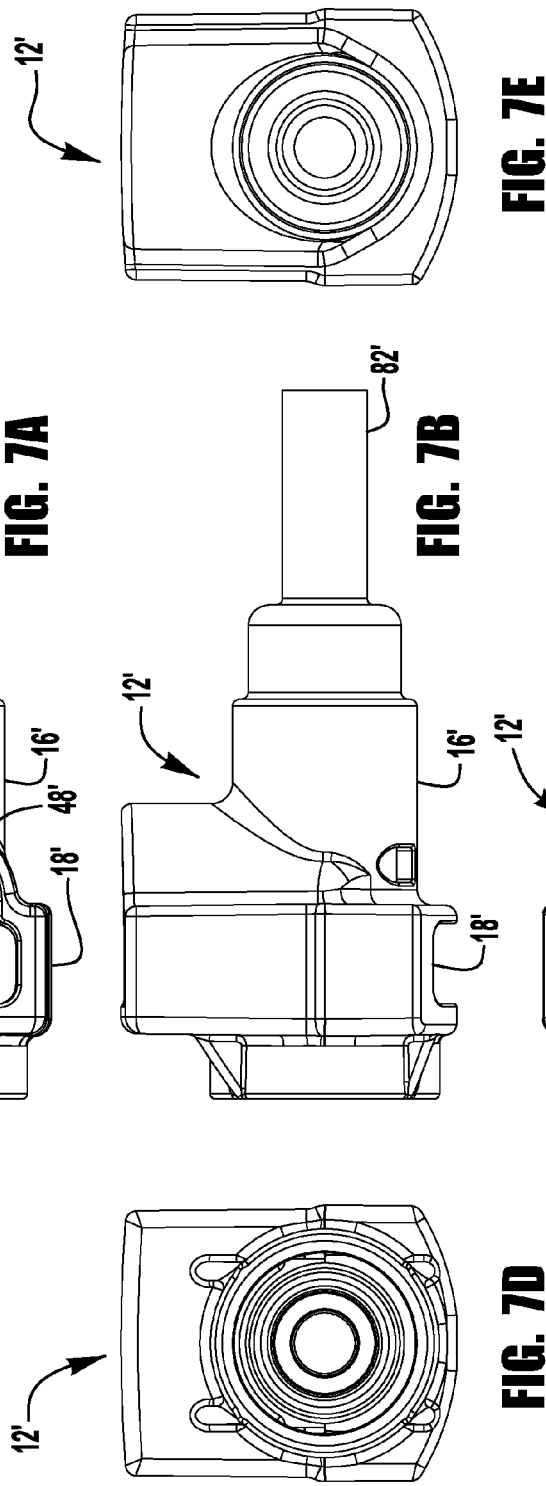
FIGS. 7A-7E are views of a housing for use in the quick connect coupling of FIG. 3
Figure 8:
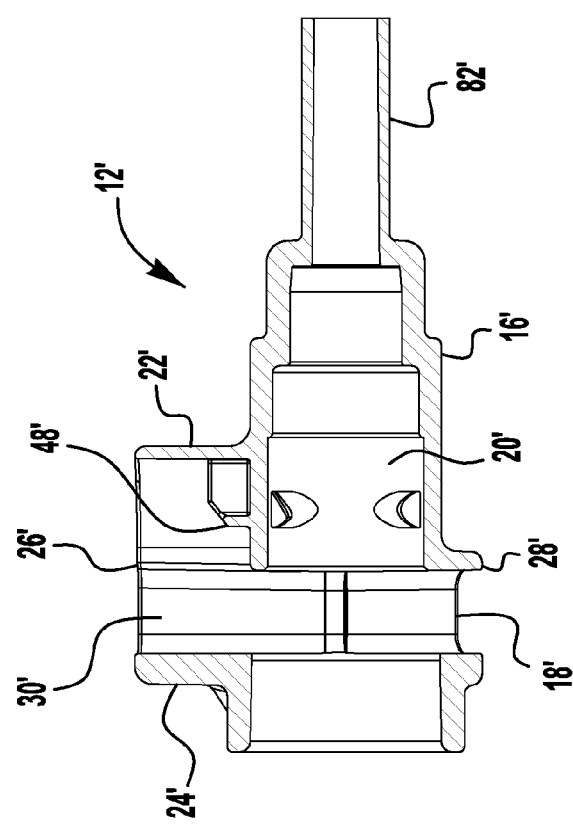
FIG. 8 is a cross-sectional view of the housing of FIGS. 7A-7E taken along the line 8-8 in FIG. 7A.

An exemplary embodiment of the housing 12 is shown in detail in FIGS. 5A-6. An exemplary embodiment of the housing 12' is shown in detail in FIGS. 7A-8. The housing 12, 12' has a longitudinal portion 16, 16' and a transverse portion 18, 18'. The housing 12, 12' has a longitudinal bore 20, 20' extending therethrough. The transverse portion 18, 18' has a first side 22, 22' and a second side 24, 24'. The transverse portion 18, 18' also has a top side 26, 26' and a bottom side 28, 28'. The transverse portion 18, 18' has an opening 30, 30' extending from the top side 26, 26' through the bottom side 28, 28' transversely to the bore 20, 20'. In an exemplary embodiment, the housing 12, 12' is made of a polyphenylsulphone.

Figure 10:
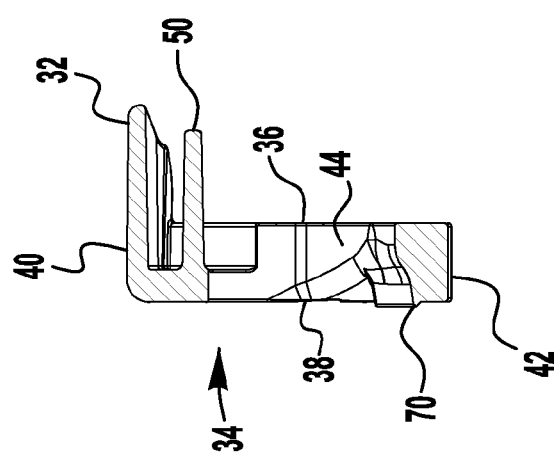
FIG. 10 is a cross-sectional view of the clip of FIGS. 9A-9E taken along the line 10-10 in FIG. 9A.

An exemplary embodiment of the clip 14 is shown in detail in FIGS. 9A-10. The clip 14 has a top portion 32 and a base portion 34. The base portion 34 has a first side 36 and a second side 38. The base portion 34 also has a top side 40 and a bottom side 42. The base portion 34 has an opening 44 extending from the first side 36 through the second side 38 between the top side 40 and the bottom side 42. The top portion 32 extends outwardly from the first side 36 of the base portion 34 near the top side 40 of the base portion 34. In an exemplary embodiment, the clip 14 is made of an acetal.

The coupling 10, 10' includes a bias feature. The bias feature includes bias structure 46, 46' on the housing 12, 12' and/or on the clip 14. The bias structure 46, 46' is operable to bias the clip 14 toward a position in which the bore 20, 20' in the housing 12, 12' and the opening 44 in the clip 14 are not aligned. In the illustrated embodiment, the bias structure 46, 46' includes a projection 48, 48' on the housing 12, 12' and a finger 50 on the clip 14. The projection 48, 48' extends upwardly inside the transverse portion 18, 18' of the housing 12, 12' below the finger 50. The finger 50 extends outwardly from the first side 36 of the base portion 34 of the clip 14 below the top portion 32. While the bias structure 46, 46' has been illustrated as including a projection 48, 48' on the housing 12, 12' and a finger 50 on the clip 14, one of ordinary skill in the art will appreciate that the bias structure 46, 46' could include any structure on the housing 12, 12' and/or on the clip 14 that biases the clip 14 toward a position in which the bore 20, 20' in the housing 12, 12' and the opening 44 in the clip 14 are not aligned.

An exemplary embodiment of a male component 52 for use with the coupling 10 is shown in detail in FIGS. 1-2D. The male component 52 has a first end 54 and a second end 56. The male component 52 has a first circumferential flange 58 and a second circumferential flange 60 near the first end 54. The first flange 58 and the second flange 60 form a groove 62.

A sealing member 64, such as an O-ring, is disposed in the groove 62 to form a fluid tight seal between the male component 52 and the coupling 10.

An exemplary embodiment of a male component 52' for use with the coupling 10' is shown in detail in FIGS. 3-4C. The male component 52' has a first end 54' and a second end 56'. The male component 52' has a first circumferential flange 58' between the first end 54' and the second end 56'. A sleeve 66' is disposed around the male component 52' between the first end 54' and the first circumferential flange 58'. In an exemplary embodiment, the sleeve 66' is made of an acetal. A sealing member 64', such as an O-ring, is disposed around the male component 52' between the first end 54' and the sleeve 66' to form a fluid tight seal between the male component 52' and the coupling 10'.

To assemble the coupling 10, 10', the bottom side 42 of the base portion 34 of the clip 14 is inserted through the top side 26, 26' of the transverse portion 18, 18' of the housing 12, 12' into the opening 30, 30' in the transverse portion 18, 18'. The clip 14 is moved downwardly until the top portion 32 of the clip 14 is generally aligned with the top side 26, 26' of the transverse portion 18, 18' of the housing 12, 12' and the bottom side 42 of the base portion 34 of the clip 14 is generally aligned with the bottom side 28, 28' of the transverse portion 18, 18' of the housing 12, 12'. In this position, the finger 50 on the clip 14 contacts the projection 48, 48' on the housing 12, 12', but the finger 50 is not deflected or is only slightly deflected. Also in this position, the opening 44 in the clip 14 and the bore 20, 20' in the housing 12, 12' are not aligned.

To connect the male component 52, 52' to the coupling 10, 10', the clip 14 is moved downwardly by exerting a downward force against the top portion 32 of the clip 14 until the opening 44 in the clip 14 and the bore 20, 20' in the housing 12, 12' are aligned. In this position, the finger 50 is deflected against the projection 48, 48'. The first end 54, 54' of the male component 52, 52' is inserted through the second side 24, 24' of the transverse portion 18, 18' of the housing 12, 12' into the bore 20, 20' in the housing 12, 12'. The male component 52, 52' is moved inwardly until the first flange 58 and the second flange 60 on the male component 52, or the first flange 58' on the male component 52', have moved past the opening 30, 30' in the transverse portion 18, 18' of the housing 12, 12'. The top portion 32 of the clip 14 is released causing the clip 14 to move upwardly until the opening 44 in the clip 14 and the bore 20, 20' in the housing 12, 12' are no longer aligned. In this position, the second flange 60 on the male component 52, or the first flange 58' on the male component 52', contacts the first side 36 of the base portion 34 of the clip 14 near the bottom side 42 of the base portion 34. As a result, the clip 14 is retained in the housing 12, 12'.

As explained above, to connect the male component 52, 52' to the coupling 10, 10', the clip 14 is moved downwardly by exerting a downward force against the top portion 32 of the clip 14 until the opening 44 in the clip 14 and the bore 20, 20' in the housing 12, 12' are aligned. Alternatively, the clip 14 is moved downwardly without exerting a downward force against the top portion 32 of the clip 14. The downward movement of the clip 14 is accomplished by inserting the first end 54, 54' of the male component 52, 52' through the second side 24, 24' of the transverse portion 18, 18' of the housing 12, 12' into the bore 20, 20' in the housing 12, 12'. The insertion of the first end 54, 54' of the male component 52, 52' through the second side 24, 24' of the transverse portion 18, 18' of the housing 12, 12' causes the clip 14 to move downwardly until the opening 44 in the clip 14 and the bore 20, 20' in the housing 12, 12' are aligned. In this position, the finger 50 is deflected against the projection 48, 48'. The male component 52, 52' is moved inwardly until the first flange 58 and the second flange 60 on the male component 52, or the first flange 58' on the male component 52', have moved past the opening 30, 30' in the transverse portion 18, 18' of the housing 12, 12'. Once the first flange 58 and the second flange 60 on the male component 52, or the first flange 58' on the male component 52', have moved past the opening 30, 30' in the transverse portion 18, 18' of the housing 12, 12', the clip 14 moves upwardly until the opening 44 in the clip 14 and the bore 20, 20' in the housing 12, 12' are no longer aligned. In this position, the second flange 60 on the male component 52, or the first flange 58' on the male component 52', contacts the first side 36 of the base portion 34 of the clip 14 near the bottom side 42 of the base portion 34. As a result, the clip 14 is retained in the housing 12, 12'.

To disconnect the male component 52, 52' from the coupling 10, 10', the clip 14 is moved downwardly by exerting a downward force against the top portion 32 of the clip 14 until the opening 44 in the clip 14 and the bore 20, 20' in the housing 12, 12' are aligned. In this position, the finger 50 is again deflected against the projection 48, 48'. The male component 52, 52' is removed from the housing 12, 12'. The top portion 32 of the clip 14 is released causing the clip 14 to move upwardly until the opening 44 in the clip 14 and the bore 20, 20' in the housing 12, 12' are no longer aligned.

In describing the components of the coupling 10, 10' and the connection and disconnection of the male component 52, 52' to and from the coupling 10, 10', terms describing the orientation of the components of the coupling 10, 10' are used. For example, the housing 12, 12' is described as having a top side 26, 26' and a bottom side 28, 28'. Similarly, the clip 14 is described as having a top portion 32 and a top side 40 and a bottom side 42 of a base portion 34. Additionally, reference is made to moving the clip 14 downwardly by exerting a downward force against the top portion 32 of the clip 14. Likewise, reference is made to causing the clip 14 to move upwardly by releasing the top portion 32 of the clip 14. These terms describe the components of the coupling 10, 10' as oriented in the drawings. However, one of ordinary skill in the art will appreciate that the coupling 10, 10' could be oriented in any direction and that these terms are relative terms and are merely used for ease of reference in describing the components of the coupling 10, 10' and the connection and disconnection of the male component 52, 52' to and from the coupling 10, 10'

As explained above, to connect and disconnect the male component 52, 52' to and from the coupling 10, 10', the clip 14 is moved downwardly by exerting a downward force against the top portion 32 of the clip 14 or, in the case of connection only, by inserting the first end 54, 54' of the male component 52, 52' through the second side 24, 24' of the transverse portion 18, 18' of the housing 12, 12' into the bore 20, 20' in the housing 12, 12'. This design enables the quick and easy connection and disconnection of the coupling 10, 10'. At times, for example when the coupling 10, 10' is unpressurized, the quick and easy disconnection of the coupling 10, 10' is desirable. At other times, for example when the coupling 10, 10' is pressurized, the quick and easy disconnection of the coupling 10, 10' is undesirable.

The coupling 10, 10' includes a retention feature that enables the quick and easy disconnection of the coupling 10, 10' when the coupling 10, 10' is unpressurized, but prevents the quick and easy disconnection of the coupling 10, 10' when the coupling 10, 10' is pressurized. The retention feature includes retention structure 68, 68' on the housing 12, 12' and/or on the clip 14. The retention structure 68, 68' is operable to significantly increase the resistance to disconnect the coupling 10, 10' in a pressurized state, but not significantly increase the resistance to disconnect the coupling 10, 10' in an unpressurized state. In an exemplary embodiment, the retention structure 68, 68' includes a lead out geometry. The lead out geometry causes the second side 38 of the base portion 34 of the clip 14 to move away from an internal surface of the second side 24, 24' of the transverse portion 18, 18' of the housing 12, 12' when the clip 14 is moved downwardly. In an exemplary embodiment, the retention structure 68, 68' does not require any additional action to disconnect the coupling 10, 10'. In other words, the action required to disconnect the coupling 10, 10' with the retention structure 68, 68' is the same as the action that would be required to disconnect the coupling 10, 10' without the retention structure 68, 68'.

An exemplary embodiment of the retention structure 68, 68' is shown in detail in FIGS. 1-2D and FIGS. 3-4C, respectively. The retention structure 68, 68' includes a ridge 70 on the clip 14. The ridge 70 extends outwardly from the second side 38 of the base portion 34 of the clip 14 near a bottom of the opening 44 in the base portion 34. The ridge 70 generally extends along the bottom of the opening 44 in the base portion 34. The ridge 70 interacts with the bore 20, 20' in the housing 12, 12'.

Figure 11:
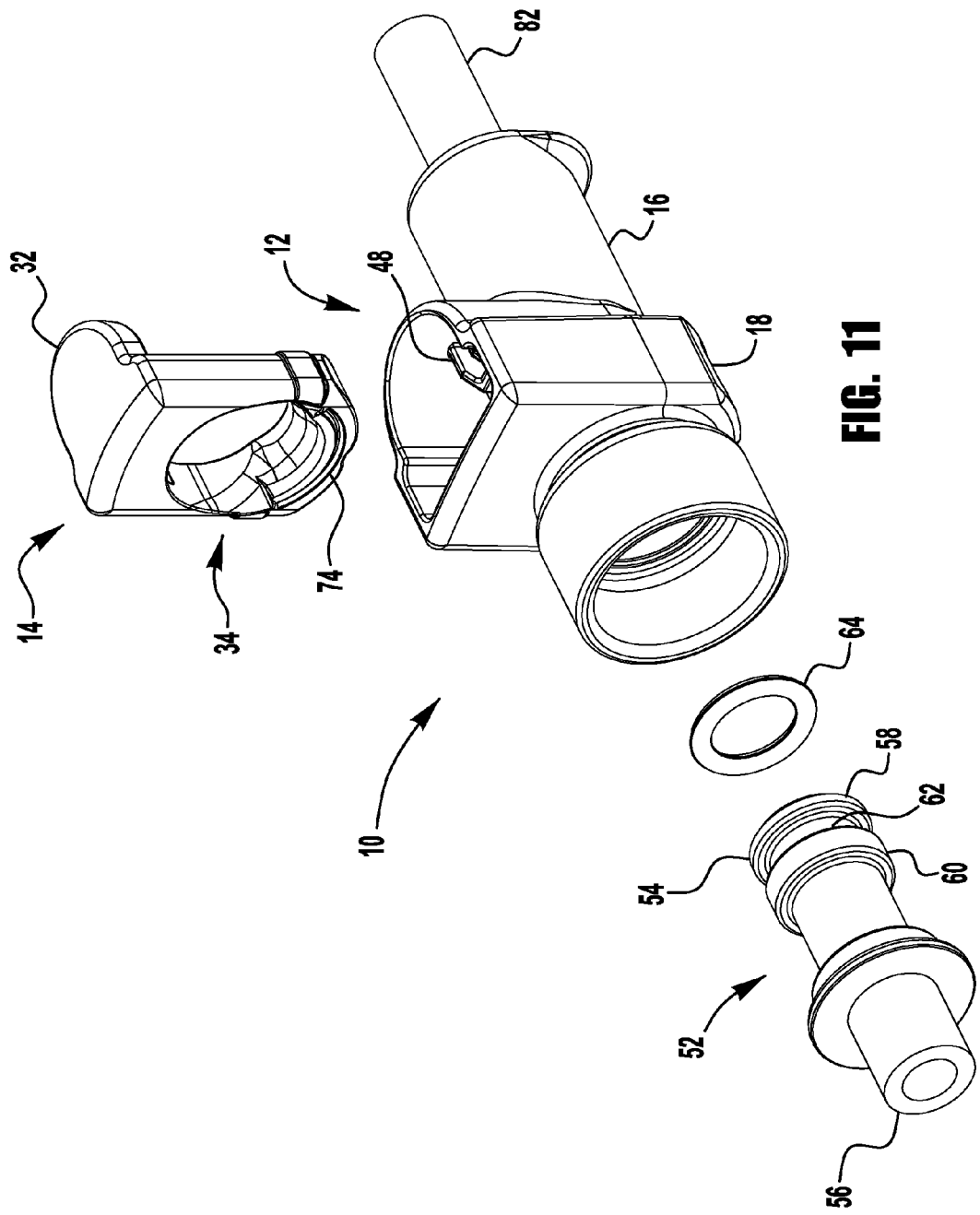
FIG. 11 is an exploded perspective view of a quick connect coupling according to another exemplary embodiment of the present invention.

Another exemplary embodiment of the retention structure 68 is shown in detail in FIGS. 11-12D. The retention structure 68 includes a ridge 72 on the housing 12 and a groove 74 in the clip 14. The ridge 72 extends inwardly from the second side 24 of the transverse portion 18 of the housing 12 near a bottom of the opening 30 in the transverse portion 18. The ridge 72 generally extends along the bottom of the opening 30 in the transverse portion 18. The groove 74 extends into the second side 38 of the base portion 34 of the clip 14 near a bottom of the opening 44 in the base portion 34. The groove 74 generally extends along the bottom of the opening 44 in the base portion 34. The ridge 72 on the housing 12 interacts with the groove 74 in the clip 14.

Figure 13:
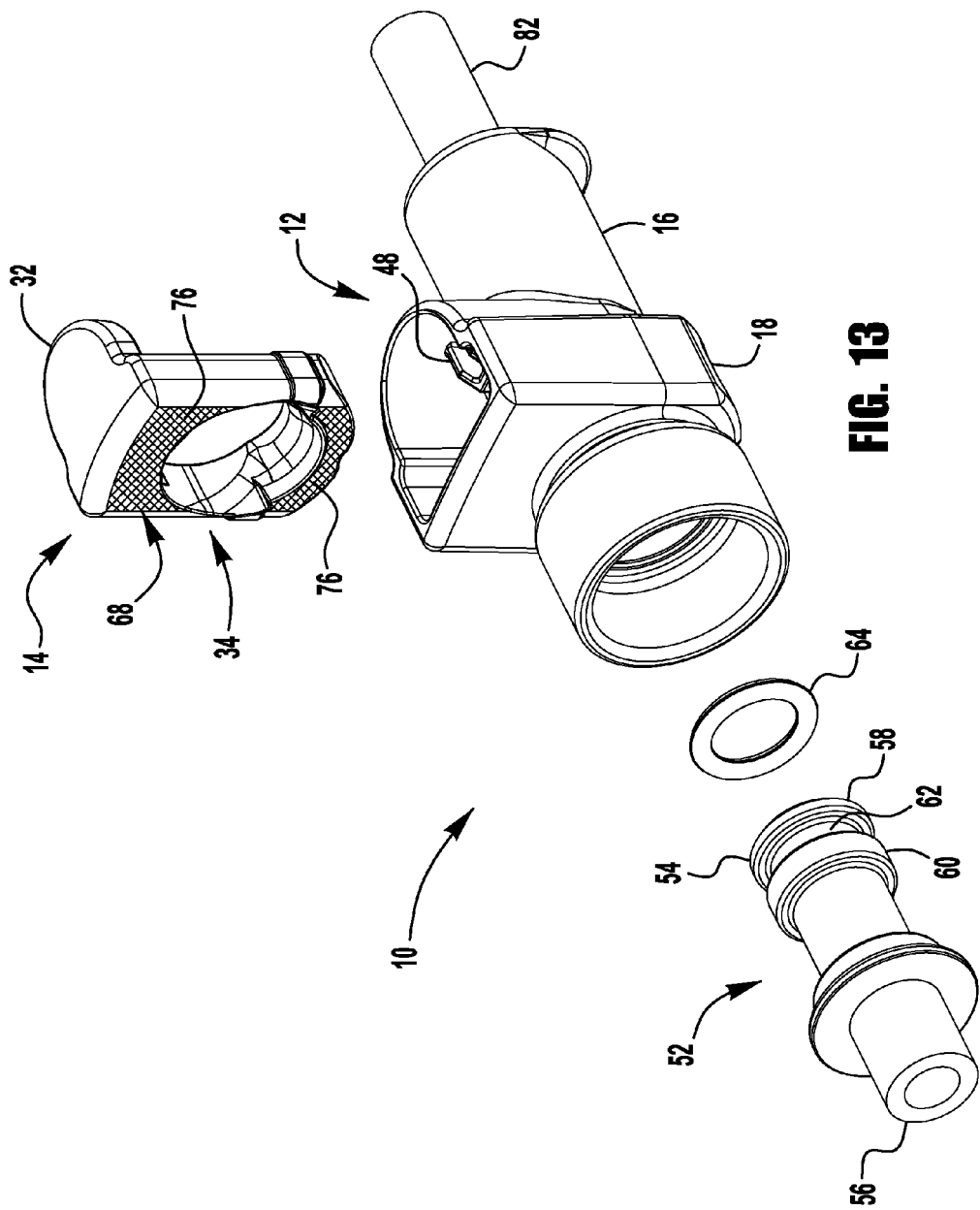
FIG. 13 is an exploded perspective view of a quick connect coupling according to another exemplary embodiment of the present invention showing another exemplary embodiment of a retention feature of the quick connect coupling.
Figure 16A:
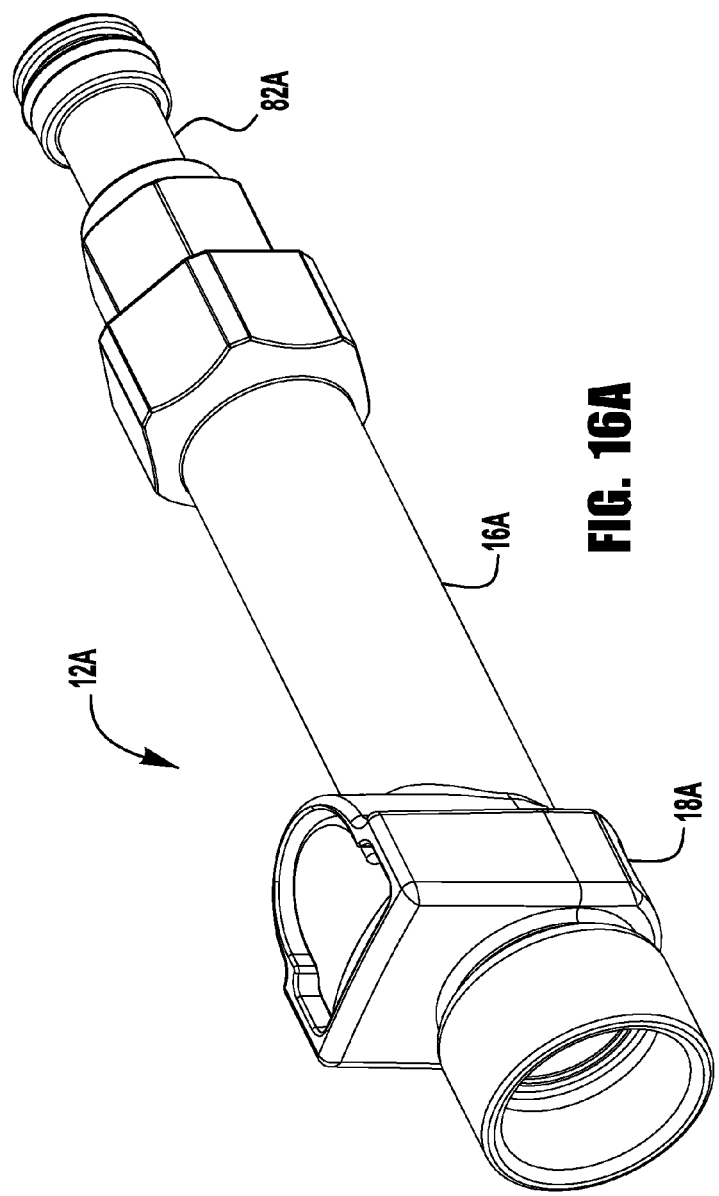

Another exemplary embodiment of the retention structure 68 is shown in detail in FIG. 13. The retention structure 68 includes a textured surface 76 on the second side 38 of the base portion 34 of the clip 14 and/or on an internal surface of the second side 24 of the transverse portion 18 of the housing 12. The textured surface 76 on the second side 38 of the base portion 34 of the clip 14 and/or on the internal surface of the second side 24 of the transverse portion 18 of the housing 12 interacts with an opposing surface of the housing 12 and/or the clip 14.

Another exemplary embodiment of the retention structure 68 is shown in detail in FIGS. 14-15. The retention structure 68 includes a tapered surface 78 on the housing 12 and an opposing tapered surface 80 on the clip 14. The tapered surface 78 on the housing 12 angles inwardly from the first side 22 of the transverse portion 18 of the housing 12 to the second side 24 of the transverse portion 18. In an exemplary embodiment, an angle of the tapered surface 78 on the housing 12 is between approximately three degrees (3°) and twenty degrees (20°). The tapered surface 80 on the clip 14 angles inwardly from the first side 36 of the base portion 34 of the clip 14 to the second side 38 of the base portion 34. In an exemplary embodiment, an angle of the tapered surface 80 on the clip 14 is between approximately three degrees (3°) and twenty degrees (20°). The tapered surface 78 on the housing 12 interacts with the opposing tapered surface 80 on the clip 14.

The retention structure 68, 68' has been illustrated in an exemplary embodiment as including the ridge 70 on the clip 14 that interacts with the bore 20, 20' in the housing 12, 12' and has been described in other exemplary embodiments as including the ridge 72 on the housing 12 that interacts with the groove 74 in the clip 14, as the textured surface 76 on the clip 14 and/or on the housing 12 that interact with the opposing surface of the housing 12 and/or the clip 14, and as the tapered surface 78 on the housing 12 that interacts with the opposing tapered surface 80 on the clip 14. However, one of ordinary skill in the art will appreciate that the retention structure 68, 68' could include any structure on the housing 12, 12' and/or on the clip 14 that is operable to significantly increase the resistance to disconnect the coupling 10, 10' in a pressurized state, but not significantly increase the resistance to disconnect the coupling 10, 10' in an unpressurized state.

In the illustrated embodiments, the housing 12, 12' of the coupling 10, 10' includes a connector 82, 82'. The connector 82, 82' is operable to connect the coupling 10, 10' to a component of a plumbing fixture fitting, such as a valve shank of a faucet. The connector 82, 82' is a male connector. However, one of ordinary skill in the art will appreciate that the connector 82, 82' could be a female connector.

The housing 12, 12' of the coupling 10, 10' has been illustrated in exemplary embodiments as including the longitudinal portion 16, 16', the transverse portion 18, 18', and the connector 82, 82'. However, one of ordinary skill in the art will appreciate that the coupling 10, 10' could include one or more longitudinal portions 16, 16' and one or more transverse portions 18, 18'. Additionally, one of ordinary skill in the art will appreciate that the coupling 10, 10' could include one or more connectors 82, 82' or no connectors 82, 82'. FIGS. 16A-16F illustrate additional exemplary embodiments of housings 12X for use in quick connect couplings with various combinations of longitudinal portions 16X, transverse portions 18X, and connectors 82X.

One of ordinary skill in the art will now appreciate that the present invention provides a quick connect coupling with a retention feature that resists inadvertent disconnection of the coupling in a pressurized state. Although the present invention has been shown and described with reference to a particular embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A quick connect coupling, comprising:
a housing including a longitudinal portion and a transverse portion, the housing having a longitudinal bore extending therethrough, the transverse portion having a top side and a bottom side, the transverse portion having an opening extending from the top side through the bottom side transversely to the bore;
a clip including a top portion and a base portion, the base portion having a first side and a second side, the base portion having a top side and a bottom side, the base portion having an opening extending from the first side through the second side between the top side and the bottom side, the top portion extending outwardly from the first side of the base portion near the top side of the base portion;
bias structure on at least one of the housing and the clip, the bias structure being operable to bias the clip toward a position in which the bore in the housing and the opening in the clip are not aligned; and
retention structure on at least one of the housing and the clip, the retention structure being operable to significantly increase the resistance to disconnect the coupling in a pressurized state, but not significantly increase the resistance to disconnect the coupling in an unpressurized state;
wherein the retention structure is on the clip.

2. The quick connect coupling of claim 1, wherein the retention structure includes a ridge on the clip.

3. The quick connect coupling of claim 2, wherein the ridge interacts with the bore in the housing.

4. The quick connect coupling of claim 2, wherein the ridge extends outwardly from the second side of the base portion of the clip near a bottom of the opening in the base portion.

5. A quick connect coupling, comprising:
a housing including a longitudinal portion and a transverse portion, the housing having a longitudinal bore extending therethrough, the transverse portion having a top side and a bottom side, the transverse portion having an opening extending from the top side through the bottom side transversely to the bore;
a clip including a top portion and a base portion, the base portion having a first side and a second side, the base portion having a top side and a bottom side, the base portion having an opening extending from the first side through the second side between the top side and the bottom side, the top portion extending outwardly from the first side of the base portion near the top side of the base portion;
bias structure on at least one of the housing and the clip, the bias structure being operable to bias the clip toward a position in which the bore in the housing and the opening in the clip are not aligned; and
retention structure on at least one of the housing and the clip, the retention structure being operable to significantly increase the resistance to disconnect the coupling in a pressurized state, but not significantly increase the resistance to disconnect the coupling in an unpressurized state;
wherein the bias structure is on the housing;
wherein the bias structure includes a projection on the housing; and
wherein the projection extends upwardly inside the transverse portion of the housing.

6. A quick connect coupling, comprising:
a housing including a longitudinal portion and a transverse portion, the housing having a longitudinal bore extending therethrough, the transverse portion having a top side and a bottom side, the transverse portion having an opening extending from the top side through the bottom side transversely to the bore, the housing including a projection extending upwardly inside the transverse portion of the housing; and
a clip including a top portion and a base portion, the base portion having a first side and a second side, the base portion having a top side and a bottom side, the base portion having an opening extending from the first side through the second side between the top side and the bottom side, the top portion extending outwardly from the first side of the base portion near the top side of the base portion, the clip including a finger extending outwardly from the first side of the base portion of the clip below the top portion, the clip including a ridge extending outwardly from the second side of the base portion of the clip near a bottom of the opening in the base portion;
wherein the finger on the clip interacts with the projection on the housing to bias the clip toward a position in which the bore in the housing and the opening in the clip are not aligned; and wherein the ridge on the clip interacts with the bore in the housing to significantly increase the resistance to disconnect the coupling in a pressurized state, but not significantly increase the resistance to disconnect the coupling in an unpressurized state.

* * * * *